United States Patent [19]

Belart

[11] 4,316,642
[45] Feb. 23, 1982

[54] CONTROL DEVICE FOR HYDRAULIC BRAKE SYSTEMS INCORPORATING ANTISKID CONTROL APPARATUS

[75] Inventor: Juan Belart, Walldorf, Fed. Rep. of Germany

[73] Assignee: ITT Industries, Inc., New York, N.Y.

[21] Appl. No.: 122,094

[22] Filed: Feb. 19, 1980

[30] Foreign Application Priority Data

Mar. 5, 1979 [DE] Fed. Rep. of Germany ....... 2908482

[51] Int. Cl.³ .............................................. B60T 8/04
[52] U.S. Cl. .................................................. 303/116
[58] Field of Search .............. 188/181 A; 303/10, 92, 303/115, 116

[56] References Cited

U.S. PATENT DOCUMENTS 3,999,808 12/1976 Belart .............................. 303/116 X
4,212,501 7/1980 Miyakawa et al. ................. 303/116

FOREIGN PATENT DOCUMENTS 2444765 4/1976 Fed. Rep. of Germany ...... 303/116

Primary Examiner—Duane A. Reger
Attorney, Agent, or Firm—John T. O'Halloran; Alfred C. Hill

[57] ABSTRACT

An improved hydraulic control unit for brake systems incorporating antiskid control apparatus which eliminates impacts on the brake pedal during an antiskid regulation cycle, which is of simpler design than known prior art and which requires less accumulator energy includes a control piston disposed on and spaced from the inlet chamber side of an outlet piston and a piston shaft connected between the outlet piston and the control piston. The control piston defines one boundary of a reaction chamber and a spring disposed in a control chamber disposed on the side of the control piston remote from the outlet piston prestresses the control piston and the outlet in the direction of an outlet chamber disposed on the side of the outlet piston remote from the inlet chamber. A reaction piston defining on one end thereof the inlet chamber and on the other end thereof the other boundary of the reaction chamber is slidably disposed on the piston shaft.

4 Claims, 3 Drawing Figures

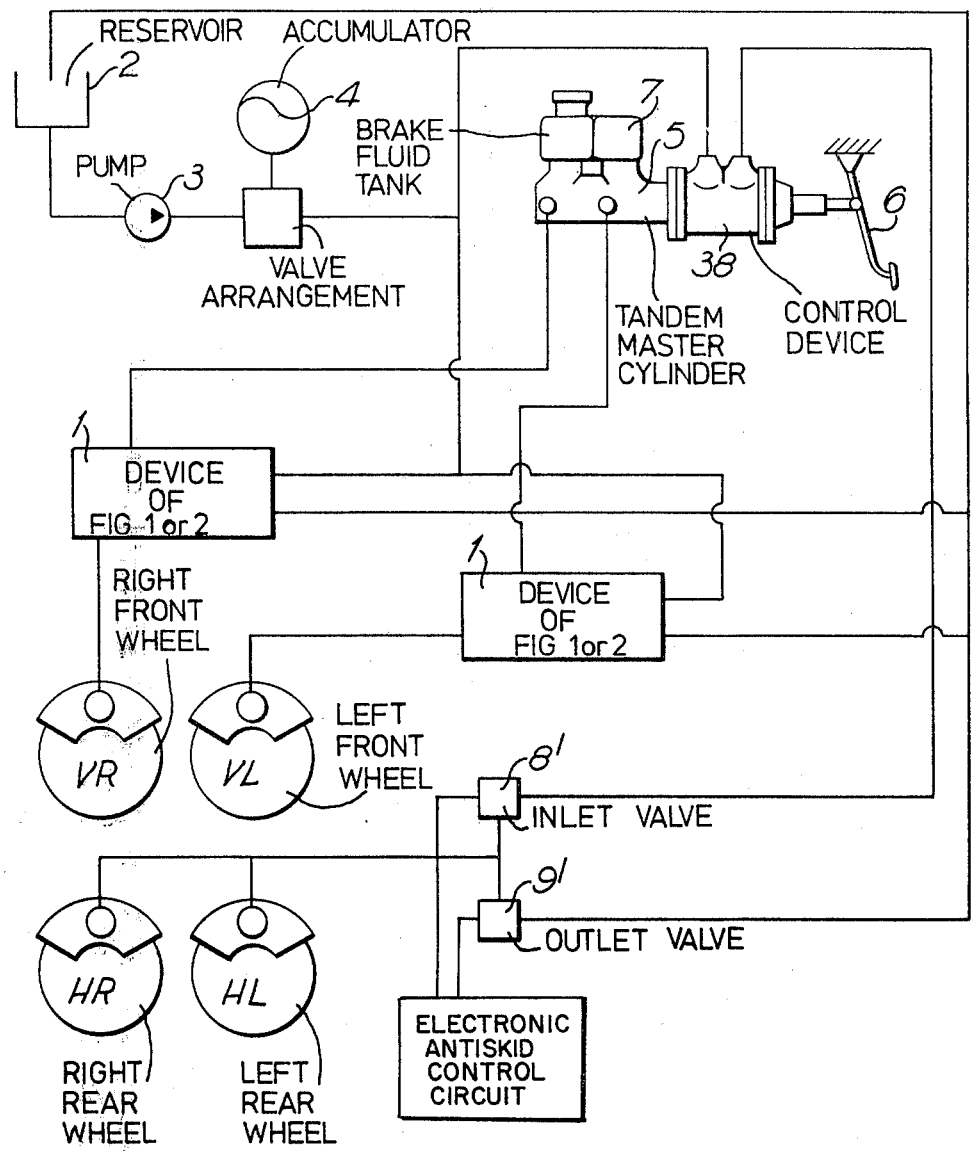

CONTROL DEVICE FOR HYDRAULIC BRAKE SYSTEMS INCORPORATING ANTISKID CONTROL APPARATUS

BACKGROUND OF THE INVENTION

This invention relates to a control device for hydraulic brake systems including wheel locking regulation apparatus. The device has a piston which is tightly slidable in a bore. The piston on one side thereof defines an inlet chamber connected with a main cylinder and on the other side an outlet chamber which is connected with at least one wheel cylinder. The piston has a passage closable by a valve member which connects the inlet chamber with the outlet chamber. The valve member in the final position of the piston, in which the outlet chamber has its smallest volume, is mechanically held open. The piston is movable in the bore by means of a control piston defining a control chamber for the purpose of enlarging the outlet chamber and a reaction piston designed as a differential piston defines the inlet chamber, wherein the smaller application surface of the reaction piston faces the inlet chamber and the larger application surface defines a reaction chamber which is directly connected to a hydraulic accumulator.

Such a device is already known from German Patent No. DE-OS 26 44 659. This device eliminates or at least substantially reduces shocks at the brake pedal which occurred with formerly customary arrangements during the wheel locking regulation cycle. Disadvantages of this device include a complicated construction which increases its cost and a large amount of auxiliary energy is required.

SUMMARY OF THE INVENTION

An object of the present invention is to provide a device of the above-mentioned type which has a simpler construction and is more economical with regard to the consumption of auxiliary energy.

A feature of the present invention is the provision of a control device for hydraulic brake systems having wheel locking regulation apparatus comprising an outlet piston slidably sealed in a housing bore, one end of the outlet piston defining one boundary of an inlet chamber connected to a master cylinder and the other end of the outlet piston defining one boundary of an outlet chamber connected to at least one wheel brake cylinder; a passage disposed coaxially in the outlet piston closable by a valve member held open by means extending from one closed end of the bore defining the other boundary of the outlet chamber when the outlet chamber has its smallest volume, the passage being connected between the inlet chamber and the outlet chamber; a control piston disposed in the bore spaced from the one end of the outlet piston, one end of the control piston spaced from the one end of the outlet piston defining in cooperation with the other closed end of the bore a control chamber selectively coupled to one of a pressure accumulator and a reservoir and the other end of the control piston adjacent the one end of the outlet piston defining one boundary of a reaction chamber connected directly to the accumulator; a piston shaft connected between the one end of the outlet piston and the other end of the control piston to enable movement of the control piston to directly move the outlet piston; a first spring disposed in the control chamber to prestress the control piston and the outlet piston in the direction of the outlet chamber; and a reaction piston disposed in a slidably sealed relation on the piston shaft having a first actuating surface transverse of the bore defining the other boundary of the inlet chamber and a second actuating surface having an area different from the area of the first actuating surface transverse of the bore defining the other boundary of the reaction chamber.

The essential advantage of the device according to the present invention is that the housing has no fixed partitions and thus can be manufactured from one side. From the point of view of production engineering this is a considerable simplification. Apart from that with the device according to the present invention the number of the chambers to which servo pressure is applied is smaller, which results in a saving of auxiliary energy.

According to a preferred embodiment of the present invention the ratio of the area of the actuating surface of the reaction piston facing the reaction chamber to the area of the actuating surface of the reaction piston facing the inlet chamber is chosen in such a way that it corresponds to the ratio of the normal pressure of the hydraulic accumulator to the brake pressure limit. This ensures that the brake pressure limit will not be exceeded. In case of exceeding the brake pressure limit the reaction piston would withdraw and take up hydraulic pressure fluid from the system which possibly could result in a limitation of the brake pressure.

A very advantageous form of design is that the reaction piston has a third actuating surface which defines a ring room which is connected to a pressureless reservoir by means of a return pipe, wherein this connection is closable by a first valve and the ring room can be connected to the reaction room by a second valve. These valves are controlled by the movement of the piston rods in such a way that one of the valves is always closed and one is opened. By this arrangement the reaction piston is always subject to such sliding power that a constant distance to the piston is maintained and, thus, with the antilocking regulation no essential changes in the volume of the inlet chamber occur.

A further feature of the present invention is that the reaction piston has a coaxial outlet towards the reaction room, the interior end of which is connected to the return pipe by a hydraulic line and that a sleeve whch can be moved on the piston rod shaft engages the coaxial outlet. This sleeve has a conical enlargement which together with the end of the coaxial outlet in the reaction chamber forms the second valve and the end surface of the sleeve directed toward the inlet chamber forms, together with the edge of the piston shaft, the first valve. A spring is arranged between the sleeve and the control piston and a hydraulic channel leading into the ring room ends in that part of the coaxial outlet between the valves. This results in a very simple design of the first and second valve as well as of the hydraulic connections.

BRIEF DESCRIPTION OF THE DRAWING

Above-mentioned and other features and objects of this invention will become more apparent by reference to the following description taken in conjunction with the accompanying drawing, in which:

FIG. 3 is a circuit diagram of an example of the especially suitable application of the device according to the principles of the present invention.

DESCRIPTION OF THE PREFERRED EMBODIMENTS

Figure 1:
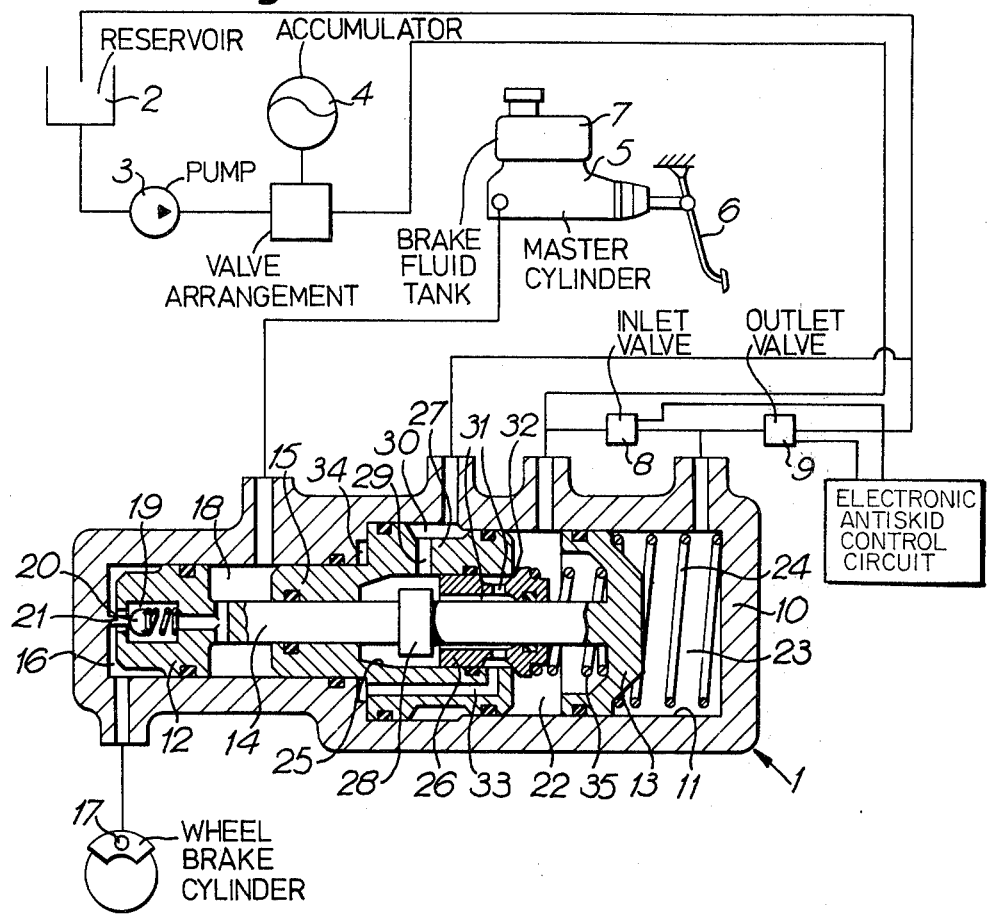
FIG. 1 is a longitudinal cross-sectional view of a plunger piston unit or device in accordance with the principle of the present invention connected in a hydraulic brake system.

Referring to FIG. 1, the device 1 according to the principles of the present invention is connected in a hydraulic brake system including a reservoir 2, a pump 3, a pressure accumulator 4 and a master cylinder 5.

Master cylinder 5 is operated by a brake pedal 6 and is provided with a brake fluid tank 7. An inlet valve 8 and an outlet valve 9 form the pressure medium control part of an antiskid system. The connections between the parts already mentioned are shown by the appropriate lines. The special construction of part 2–9 is not important, they are shown only to allow an easier understanding of the function of device 1.

Device 1 has a housing 10 with a stepped bore 11 having in the smaller diameter section thereof an outlet piston 12 arranged in a sealed movable manner. In the larger diameter section of stepped bore 11, a control piston 13 is arranged, which by means of a piston shaft 14 is connected to piston 12. On piston shaft 14 a stepped reaction piston 15 is arranged in a sealed movable manner. The smaller step of reaction piston 15 is disposed in the smaller diameter section of bore 11 and the larger step of reaction piston 15 is disposed in the larger diameter section of bore 11.

Piston 12 defines with its side spaced from reaction piston 15 an outlet chamber 16, which is connected to a wheel brake cylinder 17. An inlet chamber 18 connected to master cylinder 5 is on the one hand defined by piston 12 and on the other hand by reaction piston 15. In piston 12 a pressure medium passage 19 is provided in which a spring-loaded valve member which is ball-shaped is arranged. The ball 20 is lifted from its valve seat via a pin 21, which is fixed at the bottom of outlet chamber 16, as long as piston 12 is in the position illustrated.

The reaction chamber 22 is on the one hand defined by the large piston step of reaction piston 15 and on the other hand by control piston 13. Reaction room 22 is constantly connected to accumulator 4. The side of control piston 13 which is spaced from reaction piston 15 defines a control chamber 23 which with operation of inlet valve 8 is connected to accumulator 4 and with operation of outlet valve 9 is connected to reservoir 2. In control room 23 a pressure spring 24 is arranged which biases control piston 13 and piston 12 in the direction of outlet chamber 16.

Reaction piston 15 has a coaxial bore 25 facing towards reaction room 22. On piston shaft 14 a sleeve 26 is arranged in a sealed movable manner, which partially extends into coaxial bore 25 and which is sealingly guided therein. The end of sleeve 26 which is disposed in bore 25 forms the seat of the first valve 27, which is closable by an edge or enlargement 28 of piston shaft 14. The interior end of bore 25 is connected to reservoir 2 by a hydraulic channel 29 and a ring chamber 30 and a hydraulic pipe. In sleeve 26 hydraulic channels 31 are provided which connect reaction chamber 22 to the interior part of bore 25. The part of sleeve 26 which is disposed outside bore 25 is conically shaped and forms together with the edge of bore 25 the second valve 32.

A hydraulic pipe 33 which leads into a ring chamber 34 ends in hydraulic channels 31. Sleeve 26 is biased by a pressure spring 35, which is supported by control piston 13, in the direction of reaction piston 15.

Figure 2:
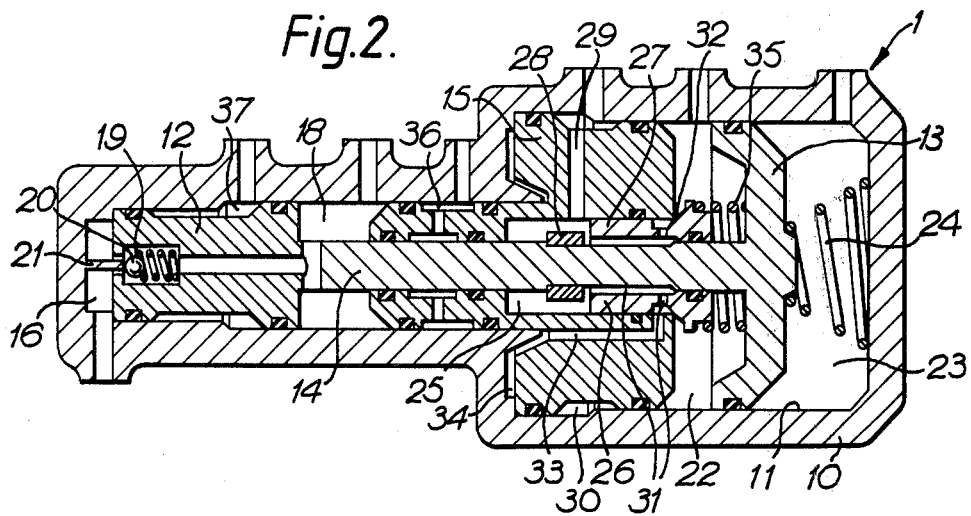
FIG. 2 is a longitudinal cross-sectional view of a design variant of the plunger piston unit or device of FIG. 1.

The device shown in FIG. 2 is basically identical with the device shown in FIG. 1, therefore the same reference numbers are applied to identical parts. Only the surface proportion between the smaller and the larger piston steps of reaction piston 15 is different, and that at the smaller piston step of reaction piston 15 as well as at piston 12 double seals with intermediate ring chambers 36 and 37 are provided, wherein ring chambers 36 and 37 are connected to the atmosphere.

The operation of the device of FIGS. 1 and 2 is as follows:

Before the beginning of a braking effect all parts are in the position described. In reaction room 22 the full pressure of pressure accumulator 4 is prevailing and is applied to reaction piston 15 and control piston 13. Inlet valve 8 is opened and outlet valve 9 is closed. Consequently, in control room 23 the full pressure of pressure accumulator 4 is also prevailing and is applied to control piston 13 in the direction of reaction room 22. As a consequence piston 12 is held in the position illustrated and thus, there is a free hydraulic connection from inlet chamber 18 to outlet chamber 16.

A brake pressure which is built up passes initially without hindrance from master cylinder 5 to wheel cylinder 17. If there is danger of wheel locking caused by excessive brake pressure, inlet valve 8 is closed and outlet valve 9 is opened, so that control room 23 is connected to reservoir 2 and the pressure medium can escape out of control room 23. As a consequence, control piston 13 and piston 12 are moved towards spring 24.

This movement has the effect that the valve seat lifts ball 20 from pin 21 and consequently, hydraulic connection 19 between inlet chamber 18 and outlet chamber 16 is interrupted. By the following further enlargement of outlet room 16 the pressure medium is released so that the brake pressure which is effective in wheel brake cylinder 17 is reduced. By the movement of control piston 13, edge 28 which is on piston shaft 14 is moved towards valve seat 27 and by this seals hydraulic channels 31. A further movement of piston shaft 14 has the effect that sleeve 26 is carried along by edge 28 and is lifted from valve seat 32. Now pressure medium can flow from reaction chamber 22 through hydraulic channel 33 into ring chamber 34. Consequently, reaction piston 15 is applied with a pressure in the direction of reaction chamber 22 and reaction piston 15 follows the movement of control piston 13, whereby valve 32 closes again. Subsequently valve 27 is opened and the pressure medium escapes out of ring chamber 34 through hydraulic channels 33, 31 and 29 as well as through ring chamber 30 and a hydraulic pipe into reservoir 2.

As soon as the danger of wheel locking is eliminated, outlet valve 9 is closed and inlet valve 8 is again opened, so that accumulator 4 is again connected to control chamber 23. Due to the pressure in control chamber 23 control piston 13 and consequently also piston 12 is moved in the direction of outlet chamber 16, ball 20 is lifted from the seat valve and hydraulic passage 19 between inlet chamber 18 and outlet chamber 16 is again opened.

If accumulator 4 fails, reaction chamber 22 and control chamber 23 becomes pressureless. Consequently, control piston 13 and piston 12 are kept in their illustrated position whereby hydraulic passage 19 is constantly open.

Accordingly, a normal brake effect without antilocking control is possible. However, inlet chamber 18 is slightly enlarged since reaction piston 15 is applied with only the pressure in inlet chamber 18 and, thus, is moved in the direction of control piston 13.

In FIG. 3 a brake system is shown in which one brake circuit is assigned to each front wheel and the two rear wheels are jointly connected to another brake circuit. The two brake circuits for the front wheels are static brake circuits and the brake circuit for the two rear wheels is a dynamic brake circuit. The brake system includes a reservoir 2, a pump 3, an accumulator 4, the devices 1, which may be the devices of FIGS. 1 or 2 along with valves 8 and 9 of FIG. 1, a tandem master cylinder 5 on which a brake fluid tank 7 is fixed, and a control device 38, which controls the hydraulic flow to the rear wheel brakes, fixed to tandem master cylinder 5. The inlet of control device 38 is connected to accumulator 4 and the outlet is connected to inlet valve 8'. The operation of this brake system is the same as set forth with regard to FIGS. 1 and 2.

By the division of the brake system into three separate brake circuits a very high degree of security is achieved. If one of the front wheel brake circuits fails, the other front wheel brake circuit as well as the brake circuit for the two rear wheels remain fully workable. If the servo power of accumulator 4 fails, both front wheel brakes remain effective due to the operation of devices 1.

The dynamic rear axle brake circuit can, of course, be replaced by a static brake circuit, wherein a device, as described with respect to FIGS. 1 and 2 can be inserted into this brake circuit.

While I have described above the principles of my invention in connection with specific apparatus, it is to be clearly understood that this description is made only by way of example and not as a limitation to the scope of my invention as set forth in the objects thereof and in the accompanying claims.

I claim:

1. A control device for hydraulic brake systems having wheel locking regulation apparatus comprising:
 an outlet piston slidably sealed in a housing bore, one end of said outlet piston defining one boundary of an inlet chamber connected to a master cylinder and the other end of said outlet piston defining one boundary of an outlet chamber connected to at least one wheel brake cylinder;
 a passage disposed coaxially in said outlet piston closable by a valve member held open by means extending from one closed end of said bore defining the other boundary of said outlet chamber when said outlet chamber has its smallest volume, said passage being connected between said inlet chamber and said outlet chamber;
 a control piston disposed in said bore spaced from said one end of said outlet piston, one end of said control piston spaced from said one end of said outlet piston defining in cooperation with the other closed end of said bore a control chamber selectively coupled to one of a pressure accumulator and a reservoir and the other end of said control piston adjacent said one end of said outlet piston defining one boundary of a reaction chamber connected directly to said accumulator;
 a piston shaft connected between said one end of said outlet piston and said other end of said control piston to enable movement of said control piston to directly move said outlet piston;
 a first spring disposed in said control chamber to prestress said control piston and said outlet piston in the direction of said outlet chamber; and
 a reaction piston disposed in a slidably sealed relation on said piston shaft having a first actuating surface transverse of said bore defining the other boundary of said inlet chamber and a second actuating surface having an area different from the area of said first actuating surface transverse of said bore defining the other boundary of said reaction chamber.

2. A device according to claim 1, wherein the ratio of the area of said second actuating surface to the area of said first actuating surface corresponds to the ratio of the normal pressure of said accumulator to a brake pressure limit.

3. A device according to claims 1 or 2, wherein said reaction piston further includes
 a third actuating surface defining a ring chamber, and
 a connection coupled between said ring chamber and
 a pressureless reservoir; and
further including
 a first valve to control said connection, and
 a second valve to connect said ring chamber to said reaction chamber, said first and second valves being controlled by movement of said piston shaft in such a way that one of said first and second valves is always open and the other of said first and second valves is always closed.

4. A device according to claim 3, wherein said reaction further includes
 a coaxial bore having an open end at said other boundary of said reaction chambers,
 a hydraulic pipe connecting said ring chamber to said coaxial bore, and
 a radial bore connecting said coaxial bore to said reservoir; and
further including
 a sleeve axially slidable on said piston shaft and in said coaxial bore having one end thereof spaced from said open end cooperating with an enlargement on said piston shaft to provide said first valve and a conical enlargement on the other end thereof cooperating with said open end to provide said second valve, said hydraulic pipe terminating in said coaxial bore between said first and second valves and said radial bore termination in said coaxial bore adjacent said enlargement; and
 a second spring disposed between said sleeve and said control piston in said reaction chamber.

* * * * *